INVENTOR.
WILFRIED HOFMANN
JOSEF PFEIFER

United States Patent Office 3,519,213
Patented July 7, 1970

3,519,213
INDICATOR ASSEMBLY FOR CONVOLUTED BAND MATERIAL IN MOTION PICTURE CAMERAS OR THE LIKE
Wilfred Hofmann, Munich, and Josef Pfeifer, Unterhaching, near Munich, Germany, assignor to Agfa-Gevaert Aktiengesellschaft, Leverkusen, Germany
Filed Apr. 18, 1968, Ser. No. 722,465
Claims priority, application Germany, Apr. 22, 1967, A 55,513
Int. Cl. B65h 25/04; G03b 1/04; G11b 15/32
U.S. Cl. 242—57                                8 Claims

ABSTRACT OF THE DISCLOSURE

A motion picture camera wherein the outermost convolution of the film on the supply reel is tracked by the follower of a pivotable lever whose angular position changes as a function of changes in the diameter of convoluted film when the supply reel pays out the film. The lever moves the slider of a rheostat which is in circuit with a galvanometer so that the needle of the galvanometer indicates the resistance of the rheostat and hence the diameter of film on the supply reel. A lamp lights up when the diameter of film on the supply reel decreases to a predetermined minimum value.

BACKGROUND OF THE INVENTION

The present invention relates to motion picture cameras, motion picture projectors or similar apparatus which utilize convoluted film or analogous band material. More particularly, the invention relates to improvements in indicator assemblies which can be utilized in motion picture cameras or the like to indicate the amount of film or other band material that is convoluted on a reel.

It is already known to provide a motion picture camera with a film frame counter which comprises a follower arranged to track the outermost convolution of film on a supply reel and is mechanically connected with a wheel or another indicator. As a rule, such cameras are provided with a rather complicated mechanical motion transmitting connections which actuate the indicator in response to displacement of the follower. The frame counter occupies a substantial amount of space which is at a premium in 8-millimeter cameras, particularly if such assembly further includes means for indicating that the supply of convoluted film on the reel is exhausted. The exposed portion of the indicator takes up a large part of the camera housing. Moreover, such exposed portion must be frequently installed in positions in which it is not easily observable, particularly in vertical recording cameras which are used in laboratories.

SUMMARY OF THE INVENTION

It is an object of our invention to provide a motion picture camera or a like apparatus which utilizes convoluted film or analogous band material with a simple, compact and inexpensive indicator assembly which can furnish readings or other visible or audible signals to indicate the amount of material which is convoluted on a supply reel or the like.

Another object of the invention is to provide an indicator assembly which can be used with equal advantage in 8-millimeter motion picture cameras, in microfilm cameras, in recording cameras, as well as in motion picture projectors or other apparatus which utilize convoluted band material.

A further object of the invention is to provide an indicator assembly whose parts may be mounted in the housing of a camera or the like or wherein certain parts may be mounted at a point which is remote from the supply of convoluted band material.

An additional object of the invention is to provide an indicator assembly which, in addition to indicating the momentary supply of convoluted band material, is also capable of indicating that the supply of band material is exhausted or that such supply has dwindled to a permissible minimum.

A concomitant object of the invention is to provide an indicator assembly which is particularly suited for use in all types of motion picture cameras.

Still another object of the invention is to provide an indicator assembly which can be placed in operative condition in automatic response to a manipulation which is necessary to make exposures with a motion picture camera.

Our invtnion is embodied in a photographic camera or the like, particularly in a motion picture camera which comprises a housing, a reel rotatably supported by the housing and containing a supply of convoluted film or other band material whose diameter decreases when the reel rotates in a sense to pay out the band material, tracking means supported by the housing and comprising follower means engaging the outermost convolution of band material and arranged to change its position as a function of changes in the diameter of supply of band material on the reel, variable resistor means preferably including a rheostat having a movable portion or slider arranged to change its position and to thereby change the resistance of the resistor means as a function of changes in the position of the follower means, and current-operated indicator means (e.g., a suitable galvanometer) in circuit with the resistor means and having an output member arranged to indicate the resistance of the resistor means.

In accordance with another feature of our invention, a normally open switch is arranged to close in response to movement of the follower means to a predetermined position corresponding to a predetermined minimum diameter of the supply of band material to thereby complete the circuit of a lamp or another suitable signal generator which indicates to the user that the supply of band material on the reel is exhausted or that such supply has dwindled to a permissible minimum.

The novel features which are considered as characteristic of the invention are set forth in particular in the appended claims. The improved indicator assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
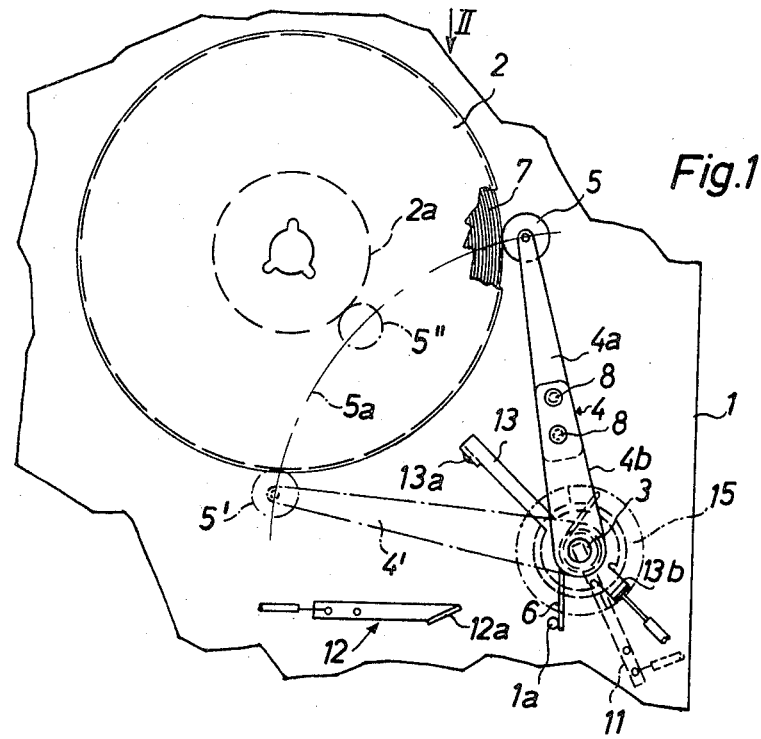
FIG. 1 is a fragmentary side elevational view of a motion picture camera including an indicator assembly which embodies our invention, the view being taken in the direction of arrow I shown in FIG. 2.
Figure 2:
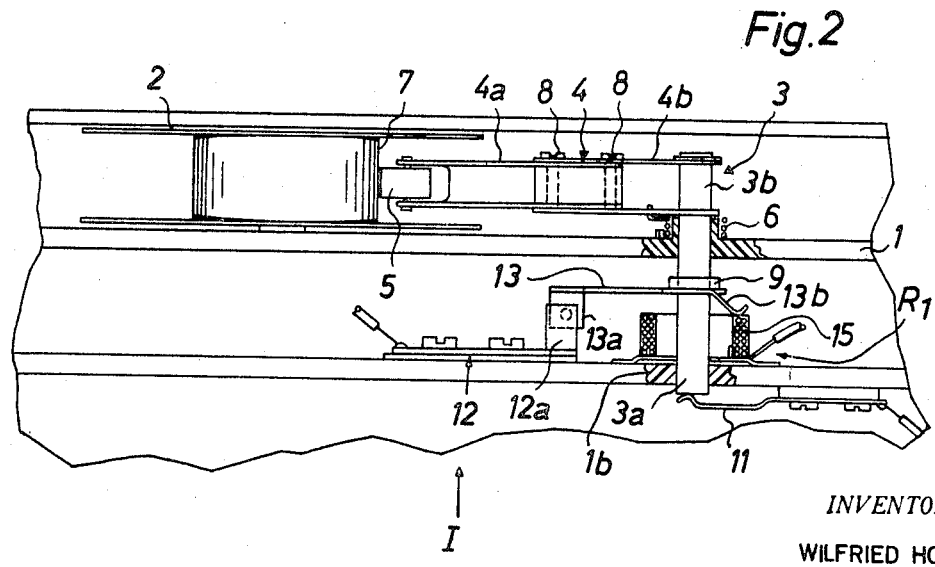
FIG. 2 is a top plan view of the structure shown in FIG. 1 as seen in the direction of arrow II.

Referring first to FIGS. 1 and 2, there is shown a portion of a motion picture camera having a housing 1 which accommodates a rotary film supply reel 2 containing a supply of convoluted unexposed film 7. The takeup reel which is driven by a motor to draw film 7 off the core 2a of the supply reel 2 is not shown in the drawing. When the takeup reel is driven to collect exposed film, the diameter of the supply of film 7 on the core 2a decreases.

The housing 1 further accommodates a shaft 3 which is turnable back and forth about a fixed axis parallel to the axis of the reel 2. The shaft 3 is rigidly connected with a tracking or sensing lever 4 having at its free end a roller follower 5 which is biased against the outer side of the outermost convolution of film 7 on the core 2a by a torsion spring 6. This spring is coiled around the shaft 3 and one of its ends engages the lever 4. The other end of the spring 6 bears against a post 1a in the housing 1. The lever 4 preferably comprises a plurality of sections 4a, 4b which are adjustably coupled to each other by one or more screws 8 or analogous fasteners to allow for adjustments in the distance between the axis of the roller 5 and shaft 3. The lever 4 assumes the solid-line position shown in FIG. 1 when the supply reel 2 contains a fresh (full) supply of unexposed film 7. The diameter of the supply of film 7 decreases when the reel pays out the film whereby the roller follower 5 travels along an arc 5a in a counterclockwise direction and approaches the axis of the reel 2. Thus, the lever 4 then turns in a counterclockwise direction under the bias of the torsion spring 6 which maintains the roller follower 5 in continuous contact with the outer side of the outermost convolution of film 7. When the supply of film 7 on the core 2a is exhausted, or when the diameter of such supply decreases to a predetermined minimum, the axes of the core 2a, roller follower 5 and shaft 3 are located in a common plane (see the position 5" of the roller follower in FIGS. 1 and 2) and the roller follower is free to move beyond the core and to the end position 5' which is indicated by phantom lines. The lever 4 then assumes the end position 4' and remains in such end position until the operator inserts a fresh supply of film into the housing 1. The shaft 3 shares all angular movements of the lever 4. This shaft comprises a portion 3b which consists of insulating material and is rigid with the lever 4, and a second portion 3a of current-conducting material. The portion 3a is journalled in an insulating portion 1b of the housing 1 and carries a collar 9 rigid with a metallic contact or tongue 13 which shares all angular movements of the lever 4. A second contact or tongue 11 bears against the current conducting portion 3a of the shaft 3 and is permanently or separably connected with the negative pole of a battery 10 or other suitable source of electrical energy shown in FIG. 3. A fixed third contact 12 is mounted in the housing 1 in the path of movement of the contact 13 and has a bent-over portion or lug 12a which constitutes a stop for a similar bent-over portion or lug 13a to arrest the contact 13 and hence the shaft 3 and lever 4 when the latter reaches the end position 4'. The contact 12 is connected with the negative pole of the battery 10, i.e., the circuit of the battery is completed when the lug 13a engages the lug 12a. This circuit includes a lamp 14 or another signal generating device which is in series with the battery 10 and produces a visible, audible or otherwise detectable signal when the lever 4 reaches the end position 4' to indicate that the supply of film 7 on the core 2a of the reel 2 is exhausted or that such supply has dwindled to a predetermined minimum. The contacts 12, 13 together form a normally open switch which closes when the diameter of film 7 on the core 2a decreases to a permissible minimum.

Figure 3:
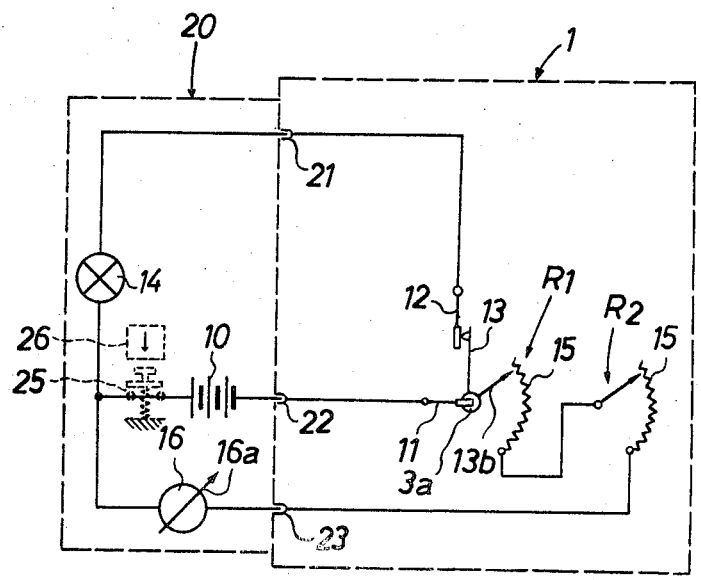
FIG. 3 is a diagram showing the electric circuit of the indicator assembly.

The contact 13 further comprises a sliding portion or tongue 13b which forms part of a variable resistor or rheostat R1 and can travel along a coiled resistance wire 15. The resistor R1 is connected in series with a current-operated indicator 16 here shown as a galvanometer which is connected in series with the battery 10 and has a movable output member or needle 16a whose position is a function of the resistance of the resistor R1. Since the resistance of the resistor R1 varies as a function of the angular position of the lever 4 and roller follower 5, and since the angular position of the lever 4 is indicative of the length of that portion of film 7 which is convoluted on the core 2a of the reel 2, the needle 16a indicates the diameter of the outermost film convolution on the core and hence the amount of unexposed film which is stored on the supply reel. It will be noted that the lamp 14 produces a signal when the supply of film 7 on the core 2a decreases to a predetermined minimum and that the needle 16a can furnish continuous indications as to the length of that portion of film which remains on the core. The needle 16a can cooperate with a graduated scale (not shown) which is calibrated to indicate the length of film on the core 2a in each angular position of the lever 4. It is clear that such scale can be calibrated to indicate the length of exposed film, i.e., the length of that portion of film which has been drawn off the reel 2. The scale can be placed into the view finder of an 8-millimeter motion picture camera or behind a separate window in the housing 1 in a position in which it can be readily observed by the user. The same holds true for the mounting of the lamp 14. If desired, the galvanometer 16 can be connected in series with two or more variable resistors. A second variable resistor or rheostat R2 is shown in FIG. 3 in series with the resistor R1.

If the invention is embodied in a portable motion picture camera, for example, in an 8-millimeter camera, the lamp 14 and galvanometer 16 are permanently installed on an outer wall of the housing 1. However, if the invention is embodied in a microfilm camera or in a recording camera which is used in a laboratory or the like, that part of the electrical circuit which includes the battery 10, lamp 14 (or a bell) and galvanometer 16 can be mounted on a table at a point adjacent to or remote from the camera. For example, the parts 14, 16 can be installed in or on a control panel located in a room other than the room wherein the camera is being used. Alternatively, only one of the parts 14, 16 can be mounted in the camera and the other part can be installed adjacent to or remote from the camera housing. The detachability of certain parts of the circuit is indicated in FIG. 3 wherein the housing 1 is shown as a separate part adjacent to or remote from a table or support 20 having an upper face supporting the battery 10, lamp 14 and galvanometer 16. The two parts of the circuit are connected to each other by pairs of male and female connectors 21, 22, 23.

When the housing 1 is to receive a fresh supply reel 2, the lever 4a is moved by hand from the position 4' to the solid-line position of FIG. 1 and is then released so that the spring 6 moves the roller follower 5 into abutment with the outermost convolution of the fresh supply of film 7. Alternatively, the shaft 3 can be provided with a wheel, crank handle or analogous manually operated means for turning the lever 4 by remote control.

The improved camera is susceptible of many modifications without departing from the spirit of our invention. For example, the electric circuit of FIG. 3 may comprise a normally open master switch 25 (indicated by broken lines) in series with the battery 10 and arranged to close in response to actuation of a shutter release trigger 26. Of course, the master switch 25 can also be closed by hand. Still further, the contact 13 can be replaced by a member of insulating material which turns with the shaft 3 and carries a trip arranged to close a microswitch replacing the contact 12. The insulating member replacing the contact 13 is then connected with an transmits motion to a slider replacing the sliding portion 13b. Moreover, the lever 4 can be indirectly connected with the contact 13 by way of a gear train or another suitable transmission. Finally, the invention can be embodied in other apparatus which utilize convoluted motion picture film or tape, for example, in a motion picture projector or in a tape recording and reproducing apparatus.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a photographic camera or the like, a combination comprising a housing; a reel rotatably supported by said housing and containing a supply of convoluted band material whose diameter decreases when the reel rotates in a direction to pay out the band material; tracking means supported by said housing and including a lever of adjustable length and follower means mounted on said lever and engaging the outermost convolution of the supply of band material, said follower means being arranged to change its position as a function of changes in the diameter of the supply; a shaft supporting said lever for pivotal movement about an axis which is parallel with the axis of said reel, the distance between said follower means and said shaft being such that said follower means can move past said reel when the diameter of said band material decreases to a predetermined value; variable resistor means having a movable portion arranged to change its position and to thereby change the resistance of said resistor means as a function of changes in the position of said follower means; and current-operated indicator means in circuit with said resistor means and having an output member arranged to indicate the resistance of said resistor means.

2. A combination as defined in claim 1, further comprising biasing means for urging said follower means against said band material and stop means for arresting said follower means in a predetermined end position when the diameter of band material decreases to said predetermined minimum value.

3. In a photographic camera or the like, a combination comprising a housing; a reel rotatably supported by said housing and containing a supply of convoluted band material whose diameter decreases when the reel rotates in a direction to pay out the band material; tracking means supported by said housing and comprising movable follower means engaging the outermost convolution of the supply of band material and arranged to change its position as a function of changes in the diameter of the supply said tracking means adapted to move past said reel when the diameter of said convoluted band material decreases to a predetermined diameter; variable resistor means having a movable portion arranged to change its position and to thereby change the resistance of said resistor means as a function of changes in the position of said follower means; current-operated indicator means in circuit with said resistor means and having an output member arranged to indicate the resistance of said resistor means; and signal generator means operative to produce a signal in response to movement of said follower means past said reel to a predetermined position representing said predetermined diameter of said band material.

4. A combination as defined in claim 3, further comprising normally open switch means arranged to close in response to movement of said follower means to said predetermined position, said predetermined position representing a minimum diamter of said supply of band material and said signal generator means being arranged to produce a signal in response to closing of said switch means.

5. A combination as defined in claim 4, wherein said switch means comprises a movable portion receiving motion from said tracking means.

6. A combination as defined in claim 3, wherein said housing comprises an outer wall supporting said indicator means and said signal generator means.

7. A combination as defined in claim 3, wherein said camera is a recording camera and further comprising a support remote from said housing, said signal generator means and said indicator means being mounted on said support.

8. A combination as defined in claim 3, wherein said indicator means is a galvanometer and said output member is the needle of said galvanometer.

References Cited

UNITED STATES PATENTS

| | | | |
|---|---|---|---|
| 1,068,119 | 7/1913 | Foote | 242—57 |
| 1,078,861 | 11/1913 | Koch | 242—57 X |
| 1,538,510 | 5/1925 | Bonk | 242—57 |
| 3,069,777 | 12/1962 | Isbell | 33—172 |

LEONARD D. CHRISTIAN, Primary Examiner

U.S. Cl. X.R.

200—61.16; 242—187